(12) United States Patent
Rose

(10) Patent No.: US 9,152,380 B2
(45) Date of Patent: Oct. 6, 2015

(54) INTERRUPT DRIVEN HARDWARE RANDOM NUMBER GENERATOR

(71) Applicant: QUALCOMM Incorporated, San Diego, CA (US)

(72) Inventor: Gregory Gordon Rose, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 340 days.

(21) Appl. No.: 13/798,067

(22) Filed: Mar. 12, 2013

(65) Prior Publication Data

US 2014/0280411 A1 Sep. 18, 2014

(51) Int. Cl.
*G06F 7/58* (2006.01)

(52) U.S. Cl.
CPC .................................. *G06F 7/58* (2013.01)

(58) Field of Classification Search
CPC ........... G06F 7/588; G06F 7/58; G06F 7/584; G06F 7/582; H03K 3/84
USPC .................................................. 708/250–256
See application file for complete search history.

(56) References Cited

U.S. PATENT DOCUMENTS

| | | | | |
|---|---|---|---|---|
| 7,251,734 | B2 * | 7/2007 | Blangy et al. ................. | 708/250 |
| 7,372,961 | B2 | 5/2008 | Vanstone et al. | |
| 2002/0046226 | A1 * | 4/2002 | Nakabe et al. ................ | 708/250 |
| 2006/0064448 | A1 | 3/2006 | Henry et al. | |
| 2007/0118581 | A1 | 5/2007 | Henry et al. | |
| 2010/0150347 | A1 | 6/2010 | Teruyama | |
| 2010/0332574 | A1 | 12/2010 | Herbert et al. | |
| 2011/0075840 | A1 | 3/2011 | Zayas et al. | |

OTHER PUBLICATIONS

Gutmann P., "Cryptographic Security Architecture: Design and Verification—Chapter 6: Random Number Generation", In: "Cryptographic Security Architecture: Design and Verification—Chapter 6: Random Number Generation", Jan. 1, 2004, Springer, XP055123981, ISBN: 978-0-38-795387-8, pp. 215-273.
Gutmann P., "Software Generation of Practically Strong Random Numbers" Proceedings of the USENIX Security Symposium, XX, Jan. 26, 1998, pp. 1-17, XP002306325.
International Search Report and Written Opinion—PCT/US2014/022614—ISA/EPO—Jul. 2, 2014.

* cited by examiner

*Primary Examiner* — Tan V. Mai
(74) *Attorney, Agent, or Firm* — Loza & Loza, LLP

(57) ABSTRACT

A method, an apparatus, and a computer program product for generating and processing random numbers are provided. An apparatus comprises a processing system that includes a processor, a random number generator and a pair of buffers. A first buffer receives low-entropy random numbers generated by the random number generator and a second buffer provides high-entropy random numbers directly to a processing system. The processing system may directly access the second buffer in response to an instruction executed by the processing system. The processing system responds to an interrupt based on occupancy levels of the buffers by conditioning low-entropy random numbers read from the first buffer to obtain high-entropy random numbers that are then stored in the second.

38 Claims, 7 Drawing Sheets

INTERRUPT DRIVEN HARDWARE RANDOM NUMBER GENERATOR

BACKGROUND

1. Field

The present disclosure relates generally to digital communication systems, and more particularly, to apparatus and methods for supplying random numbers to a processing system.

2. Background

Random numbers are used extensively in communications systems, security and encryption, simulation and gaming, and in other applications. Random numbers are commonly obtained using a hardware random number generator (RNG), which generates a sequence of numbers that appear to be uncorrelated or to have no apparent pattern. RNGs are implemented in hardware to improve throughput, particularly in applications such as simulation and gaming which make frequent use of random numbers. RNGs are also used in order to reduce the processing overhead required to generate random numbers and to minimize latency, which may be measured as the time between requesting and receiving a random number.

RNGs typically generate pseudorandom numbers that are correlated to some degree, and are therefore not completely unpredictable. Entropy measurements may be used to quantify quality of randomness of a random number. Modern RNGs may yield 8 bits of real entropy for 10 bits generated (an entropy rate of 0.8), which is generally less than entropy rates required by computing systems.

Some systems condition low-entropy numbers generated by an RNG using a cryptographic function to obtain random numbers with significantly higher entropy. Conventional systems include cryptographic functions logic circuits in the RNG to permit random numbers to be generated quickly, asynchronously and with low response latency. The addition of cryptographic functions can significantly increase the complexity of the RNG hardware, causing increased usage of integrated circuit area and increased power consumption.

Consequently, there is a need for a high throughput, low-latency RNG that occupies less die area and consumes less system power.

SUMMARY

In an aspect of the disclosure, a method, a computer program product, and an apparatus are provided. The apparatus may comprise a processing system that includes a processor and some combination of transitory and non-transitory storage.

In an aspect of the disclosure, the apparatus comprises a random number generator, a first storage device that receives random numbers generated by the random number generator and a processing system. The processing system may be configured to read a sequence of random numbers from the first storage device in response to an interrupt. The processing system may be configured to generate at least one conditioned random number by conditioning the sequence of random numbers. The processing system may be configured to store the at least one conditioned random number in a second storage device. The second storage device may be configured to maintain a plurality of conditioned random numbers and to output one of the plurality of conditioned random numbers in response to an instruction executed by the processing system.

In an aspect of the disclosure, a method for generating random numbers comprises reading random numbers generated by a physical random number generator from a first storage device in response to an interrupt, conditioning the random numbers generated by the random number generator to obtain at least one high-entropy random number, and storing the at least one high-entropy random number in a second storage device. The second storage device may be adapted to output the at least one high-entropy random number in response to an instruction executed by a processor.

In an aspect of the disclosure, an apparatus for generating random numbers comprises means for reading random numbers generated by a random number generator from a storage device in response to an interrupt, means for conditioning the random numbers generated by the random number generator to obtain at least one high-entropy random number, and means for storing the at least one high-entropy random number. The means for storing the at least one high-entropy random number is configured to output the at least one high-entropy random number in response to a machine language instruction executed by a processor.

In an aspect of the disclosure, a processor-readable storage medium has one or more instructions which, when executed by at least one processing circuit, cause the at least one processing circuit to read random numbers generated by a random number generator from a first buffer in response to an interrupt, condition the random numbers generated by the random number generator to obtain at least one high-entropy random number, and store the at least one high-entropy random number in a second buffer. The second buffer may be adapted to output the at least one high-entropy random number in response to a machine language instruction executed by a processor.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

Figure 1:
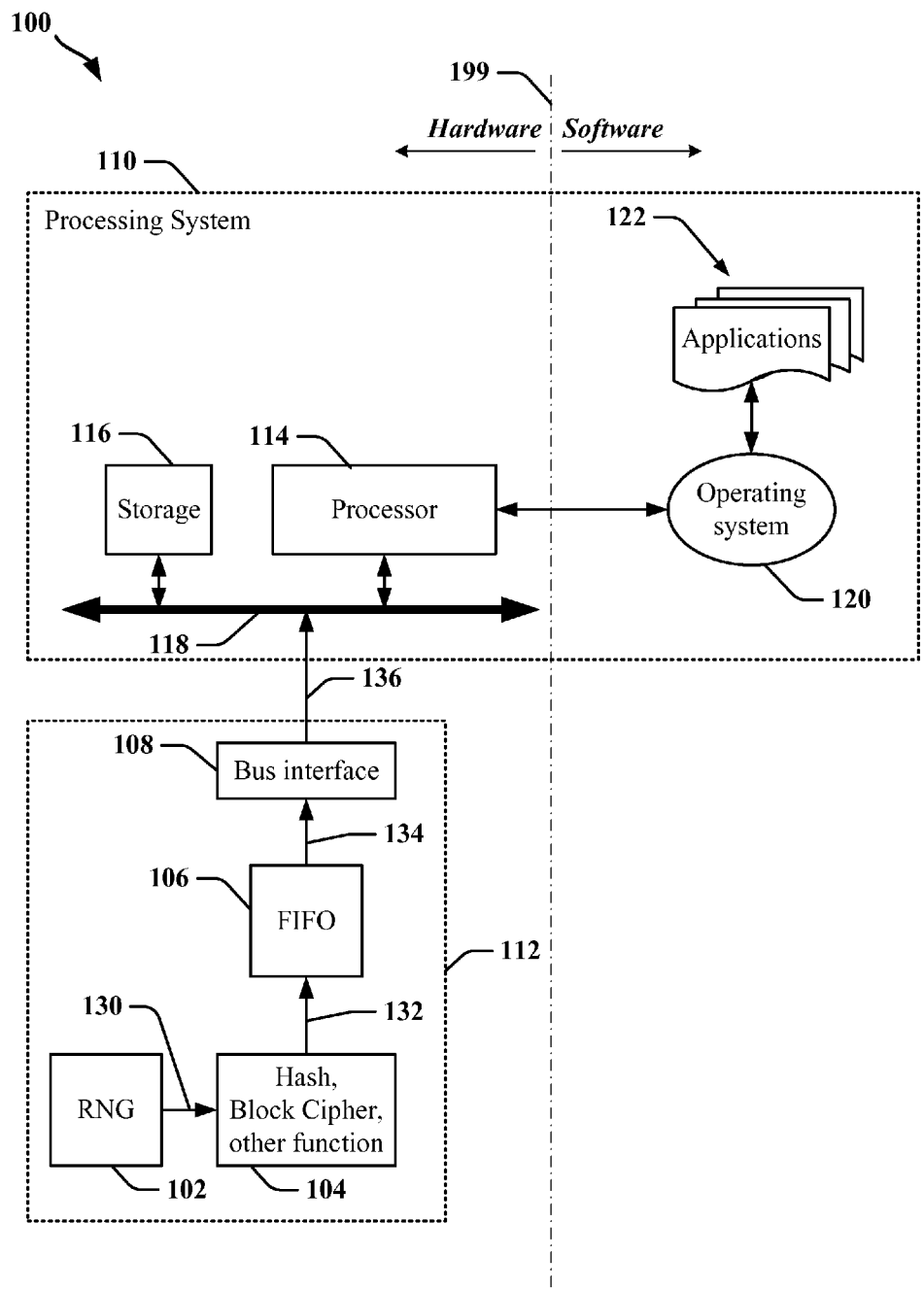
FIG. 1 depicts generation of random numbers for use in a processing system.

FIG. 1 is a diagram 100 illustrating a processing system 110 that obtains high-entropy random numbers 136 from a hardware random number processing system or circuit 112. Random number processing system 112 may be embedded in processing system 110 as a peripheral device or otherwise, including when processing system 110 is provided in an application specific integrated circuit (ASIC), a field programmable gate array (FPGA), system-on-chip, or other programmable logic. In FIG. 1, the division between hardware and software elements is delineated by dotted line 199, although software may be embodied in code and data stored in physical storage media 116 of processing system 110 and executed by processor 114.

Random number processing system 112 may comprise an RNG device 102 that generates low-entropy numbers 130. Low-entropy numbers 130 may comprise pseudorandom numbers generated from seed numbers obtained from a device or mechanism that exhibits some degree of randomness. In one example, seed numbers may be obtained from a thermal transducer, mechanical transducer or other transducer. In another example, seed numbers may be sampled at non-periodic intervals from a rapidly changing digital circuit in a manner that approximates randomness. Pseudorandom numbers may be generated based on "microscopic" observations captured on an unscheduled basis from computing system registers such as low order bits of a timer circuit, a value observed on a high frequency data bus, a measured receiver carrier strength, low order bits of a system real time clock, or from some other statistically random "noise" signal obtained from a transducer that converts a measured physical phenomena to a numerical value. These observational values may be used to seed a pseudorandom number generator to increase entropy of numbers 130 generated by RNG 102.

RNG 102 is likely to produce random numbers 130 that are somewhat correlated and have relatively low entropy, and which may have an entropy rate below entropy rates required by computing systems including processing system 110. The entropy of numbers 136 generated by random number generating circuit 102 may be increased by conditioning the output 130 of RNG 102. In one example, a series of the pseudorandom numbers 130 generated by RNG 102 is conditioned using a hash function or block cipher function 104 to obtain random numbers 132 with significantly higher entropy. The higher entropy random numbers 132 produced by function 104 may be buffered in a FIFO device 106 which may then be read by software command. FIFO device 106 may be implemented as a hardware buffer from which items are read out in the same order they were written into the hardware buffer. In one example, a FIFO device 106 comprises a plurality of registers that are connected in a pipeline, whereby numbers written into the input of the FIFO device 106 exit the pipeline in the same sequence they were written into the FIFO device 106. In another example, the FIFO device 106 may comprise a memory device organized as a circular buffer, or queue.

Processing system 110 may comprise a processor 114 that is controlled by an operating system 120. Applications 122 may make system calls into the operating system 120 to obtain random numbers 136 from random number processing system 112. Typically, a system call requesting a random number 136 initiates a software function that retrieves numbers 134 from FIFO device 106 and causes a bus interface 108 to present buffered the numbers 136 on a system bus 118, and/or on an input/output (I/O) bus or channel controlled by processor 114 or other component of system 110. The software function may further buffer or queue random numbers 136 for delivery to the application 122 which made the system call. The operating system 120 may schedule tasks according to certain system priorities. System calls made by a first application may initiate a context change whereby a second application gains control of the processor 114 and the system call response may be received only when the first application regains control of the processor 114. Accordingly, applications 122 may experience significant delays in obtaining random numbers through system calls.

Figure 2:
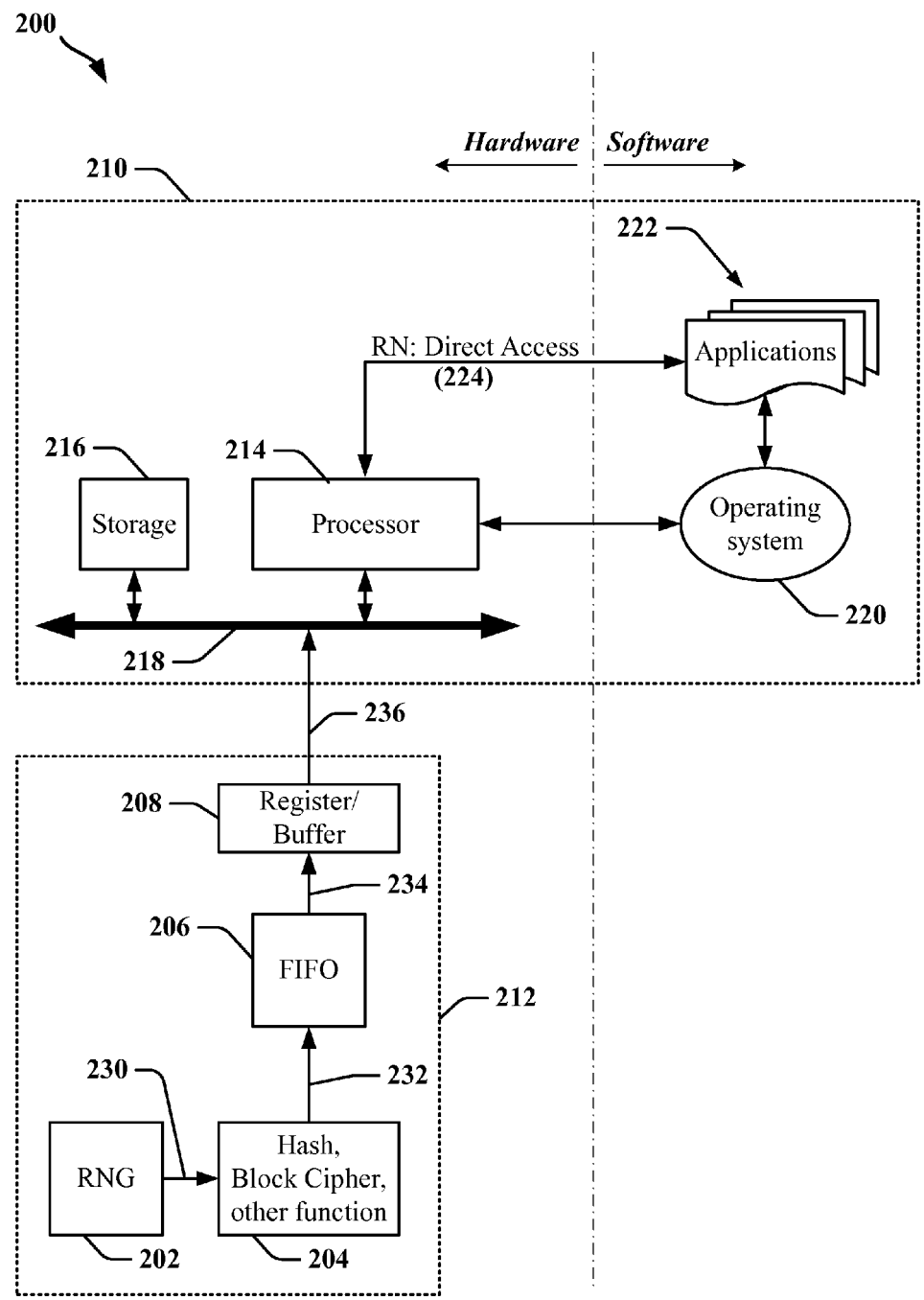
FIG. 2 illustrates random number generation with low response latency.

FIG. 2 is a schematic diagram 200 illustrating a processing system 210 that can provide high-entropy random numbers 236 from a hardware random number processing system or circuit 212 to applications 222 with low response latency. In this example, random numbers 236 generated by random number processing system 212 are stored in a register/buffer 208 that may be directly accessed by applications 222 using an instruction set corresponding to processor 214. Thus, instructions may be inserted in one or more applications 222 that enable applications 222 to read random numbers 236 directly from register/buffer 208. As with the example described in FIG. 1, pseudorandom numbers 230 generated by RNG 202 may be conditioned using a hash function, block cipher or other conditioning function 204 to obtain random numbers 232 with significantly higher entropy. Higher entropy random numbers 232 produced by block cipher function 204 can be buffered in FIFO device 206. FIFO device 206 may then provide random numbers 234 through register/buffer 208 under control of the processing system 210 and/or processor 214. In this example, access to random numbers 236 may also be managed through operating system 220, and at least some applications 222 may obtain random numbers 236 through system calls.

Random numbers 236 may be accessed by applications 222 using an instruction provided in an instruction set of the processor 214, or using a macro comprising a plurality of instructions based on the configuration of processing system 210 and other components of processing system 210. In one example, FIFO device 206 may be accessed through an addressable register or buffer 208. Register or buffer 208 may be provided internally or externally to processor 214. Processor 214 may access random numbers 236 by addressing a predefined register location and/or at a predefined location in the address space of processor 214. An application 222 may access random numbers 236 by executing one or more instructions that cause processor 214 to fetch data from a predefined address or block of addresses, or by fetching data from a set of registers defined by processor 214. An instruction set of the processor 214 may include instructions that allow a programmer to directly access random numbers 236, and/or the instruction set may be extended to enable applications 222 to directly access random numbers 236. Direct access to random numbers 236 through a programming language instruction carries the risk that an application 222 may be deadlocked if the FIFO device 206 and/or register/buffer 208 are depleted and the processor is forced to wait until random numbers 236 have been generated.

Conventional systems typically implement RNG circuits 102, 202 and a fast conditioning circuits 104, 204 in physical logic to ensure that random number processing systems 112, 212 operate with sufficient speed to satisfy requests for random numbers 136, 236. The inclusion of a conditioning circuit 104, 204 implemented in hardware can result in random number processing systems 112 or 212 that is complex and occupies a large physical area of an integrated circuit. Moreover, random number processing systems 112, 212 may consume significant power and can reduce battery life in mobile devices.

Certain embodiments of the invention modify random number generating systems 112, 212 to enable production of high throughput, low-latency, high-entropy random numbers 136, 236, while occupying less area on an IC and consuming less system power than conventional systems. In some embodiments, conditioning of low-entropy numbers 130, 230 is at least partially performed by processors 114, 214 of processing system 110, 210.

Figure 3:
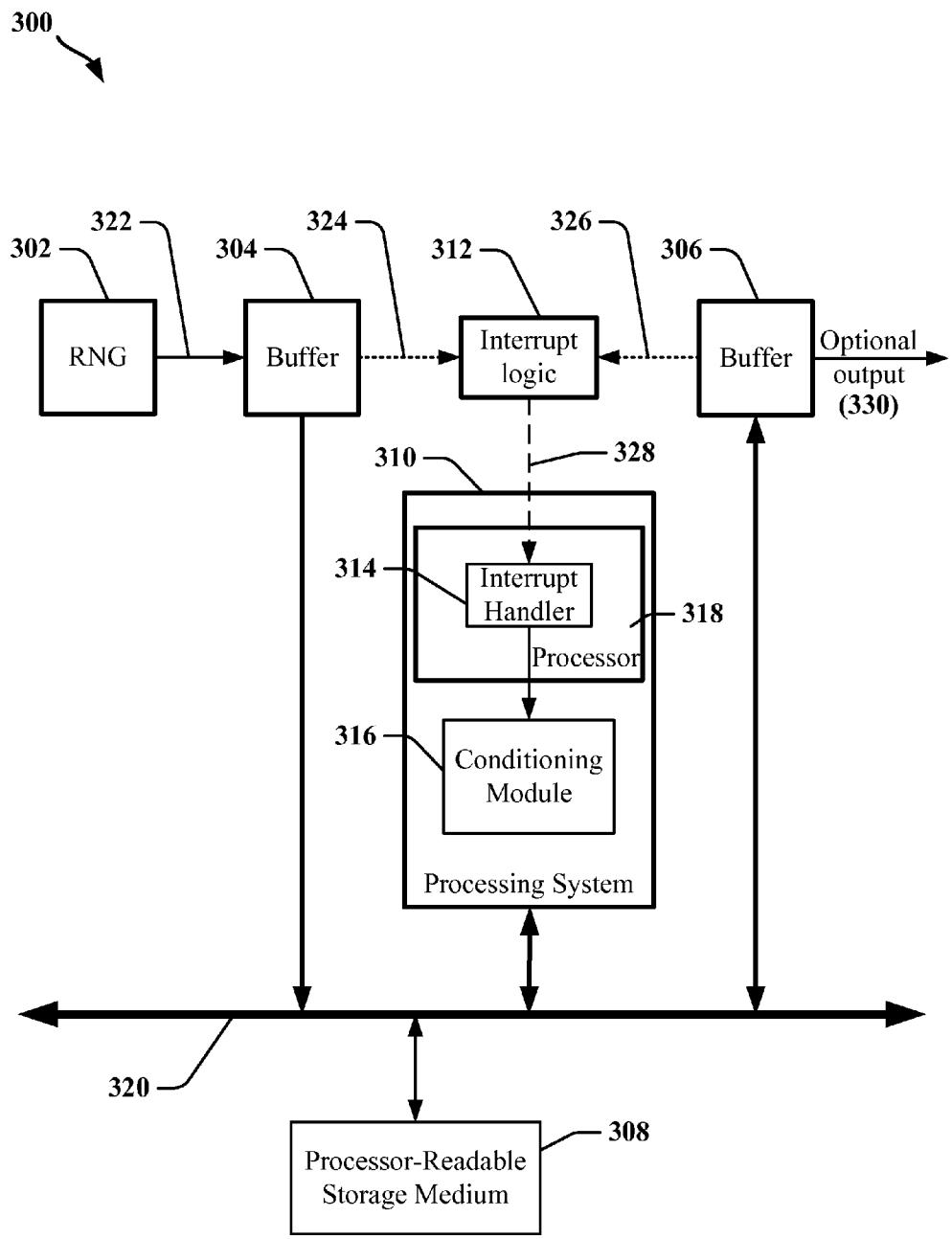
FIG. 3 illustrates an interrupt-driven hardware random number generator.

FIG. 3 is a block schematic illustrating a random number generation system 300 that overcomes many of the problems found in conventional random number generation systems. For example, random number generation system 300 typically occupies less real-estate on an IC and power consumption may be controlled because conditioning is not typically performed in a continuous manner. Random number generation system 300 may be embodied in a single IC device, or may be implemented using a plurality of separate devices. Random number generation system 300 may comprise, or interact with a processing system 310 and some combination of transitory and non-transitory storage 304, 306, and 308. Memory 308 may comprise storage devices used by processing system 310 to store data and code used to control operations of processing system 310. Memory 308 may additionally be used to store low-entropy random numbers, high-entropy random numbers and intermediates thereof.

In certain embodiments, RNG 302 generates low-entropy numbers 322 which may include pseudorandom numbers. RNG 302 may produce imperfect, low-entropy random numbers 322 that are unsuited for use in many applications, including certain communication systems, security, gaming and/or simulation applications. Pseudorandom numbers 322 may be generated using "microscopic" observations, typically captured on an unscheduled basis from computing system registers. Pseudorandom numbers 322 may be generated using values observed on a high frequency data bus, a measurement of receiver carrier strength, low order bits of a system real time clock, or some other statistically random "noise" signal obtained from a transducer that converts a measured physical phenomena to a numerical value. A series of pseudorandom numbers 322 can be obtained by repeatedly sampling a randomly varying signal. However, pseudorandom numbers 322 typically reflect some bias attributable to the mechanism used to generate the numbers. The pseudorandom numbers 322 generated by RNG 302 may be collected in a buffer 304, such as a register, a FIFO, a last-in-first-out (LIFO) circuit, a software stack, a ring buffer, or another form of storage. Buffer 304 permits RNG 302 to operate independently of processing system 310. For example, a free-running RNG 302 may continue to clock random numbers 322 into buffer 304, even if buffer 304 is full because excess random numbers 322 generated by RNG 302 may simply be discarded. In one example, a buffer 304 may discard excess random numbers at the point of entry of buffer 304 by not storing surplus random numbers. In another example, a buffer 304 comprising a FIFO or ring buffer may discard the oldest stored random number in order to store a latest random number in the buffer 304.

Buffer 304 may be serviced by an interrupt handler 314. Interrupt handler 314 may be embodied in a processor 318 of processing system 310 and may respond to an interrupt signal 328 by causing processor 318 to suspend a current processing activity and execute interrupt handler 314. Interrupt handler 314 may be configured to determine the source of the interrupt signal 328 and to initiate or activate execution of a processing module, such as conditioning module 316. Interrupt signal 328 may be generated by logic 312 that monitors the state of buffers 304 and 306. One or more signals 324 may indicate occupancy level of buffer 304. In one example, one or more signals 324 may indicate the number of random numbers stored in the buffer 304 based on one or more predetermined or preconfigured threshold levels. Interrupt logic 312 may also monitor one or more signals 326 indicating the occupancy level of buffer 306. Buffer 306 may comprise one or more of a register, a FIFO, a LIFO circuit, a software stack, a ring buffer, or another form of storage that may be adapted or configured to store high-entropy random numbers. Buffer 306 may be at least partially implemented in processor-readable storage 308.

Interrupt handler 314 may initiate an interrupt service routine, which may cause conditioning module 316 to be executed. Conditioning module 316 may extract one or more low-entropy random numbers from buffer 304, and may condition the extracted low-entropy numbers using a hash function, block cipher, or some other suitable cryptographic algorithm to produce high-entropy random numbers. The high-entropy random numbers may then be stored in buffer 306. Buffer 306 may be directly accessible by a processor through bus 320, or through another bus or I/O channel 330. In the example depicted in FIG. 3, processing system 310 may be a consumer of high-entropy random numbers and may be configured to write and read buffer 306. In some embodiments, processing system 310 may comprise a coprocessor or other processor 318 that conditions random numbers and stores high-entropy numbers in buffer 306, but that does not directly access or use high-entropy random numbers stored in buffer 306. Typically, processing system 310 is a component of an apparatus that performs one or more primary functions of the apparatus that uses high-entropy numbers.

In operation, processor 318 may be interrupted when occupancy of buffer 306 falls below a predefined threshold minimum value. The threshold minimum value may be determined based on expected demand for high-entropy numbers. A selected value for the threshold minimum buffer 306 occupancy may be low enough to limit the frequency of interrupts 328, and may be high enough to ensure that the buffer can supply high-entropy numbers on-demand, even in bursty conditions. The size of buffer 306 may be selected based on application requirements.

In some embodiments, processor 318 may be interrupted when buffer 304 holds a sufficient number of low-entropy random numbers to generate a predefined or preconfigured minimum number of high-entropy random numbers. In one example, the minimum number of high-entropy random numbers can be set to permit an interrupt 328 to be generated when at least one high-entropy random number can be generated.

Conditioning module 316 may comprise one or more algorithms to be executed by processor 318. In some embodiments, conditioning is performed within an interrupt service routine, whereby control of processor 318 is relinquished after a desired number of high-entropy random numbers have been generated, or a higher priority interrupt is asserted. In some embodiments, an interrupt service routine initiated by interrupt handler 314 sets a flag, semaphore, or other indication that enables a paused or inactive application to be executed when processor 318 exits the interrupt service routine. In some embodiments, an interrupt service routine initiated by interrupt handler 314 causes a task or thread of an operating system to become ready, whereby the conditioning module 316 is executed within the task or thread. When ready, the task or thread can be scheduled by an operating system or application control loop.

Conditioning module 316 may comprise software instructions that operate to condition low-entropy random numbers and thereby produce high-entropy random numbers. In some embodiments, conditioning module 316 may comprise one or more hardware circuits to enable or accelerate certain functions of the conditioning module 316 and/or algorithms used by the conditioning module 316. Conditioning module 316 may compute a desired cryptographic function on low-entropy random or pseudorandom numbers read from buffer 304, before writing back the results to a FIFO or other storage device within buffer 306. Accordingly, much of the dedicated hardware employed in conventional systems can be eliminated with resulting savings in die area and power consumption.

Figure 4:
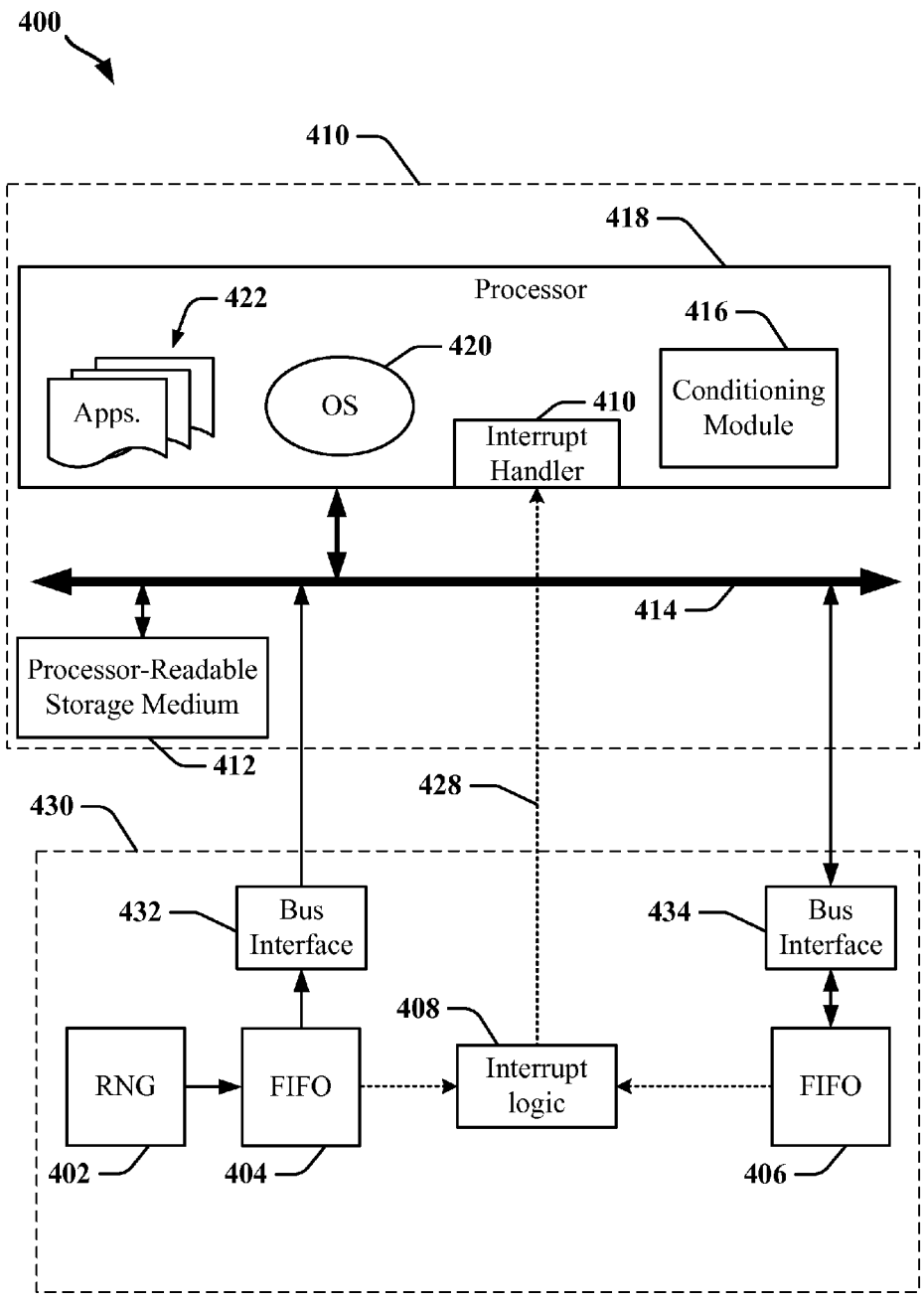
FIG. 4 is a block schematic illustrating the use of an interrupt-driven hardware random number generator in a computing system.

FIG. 4 illustrates an example 400 of an apparatus that employs a random number processing system according to certain aspects of the invention. Apparatus may comprise a processing system 410 that includes a processor 418 and a storage device 412. Instructions and data stored on storage device 412 may be executable by processor 418. Processor 418 may be controlled by operating system 420, which may provide a platform for applications 422. Additional modules, such as conditioning module 416 may execute outside of the control of the operating system 420 and may, for example, be executed in response to one or more interrupts 428 received by processor 418. In some embodiments, operating system 420 may exercise control over at least some functions of conditioning module 416. Processor 418 may comprise an interrupt handler 410 that responds to interrupts 428 received from random number generator circuits 430. Random number generator circuits 430 may comprise an RNG 402 that provides low-entropy random numbers to a first buffer 404, interrupt generation logic 408, a second buffer 406 and a bus interface 434. In the example, first and second buffers 404 and 406 may be implemented as FIFO devices 404 and 406. FIFO device 406 stores high-entropy random numbers generated by conditioning module 416 executed by processor 418. Conditioning module 416 may cause processor 418 to write conditioned random numbers to FIFO device 406 and one or more applications 422 and/or operating system may cause processor 418 to read high-entropy numbers from the FIFO device 406. Accordingly, random number conditioning is performed asynchronously with respect to applications that consume the high-entropy numbers produced by the conditioning module 416. Bus interfaces 432 and 434 may comprise logic and buffers that enable FIFO devices 404 and 406 to interact with bus 414 or other I/O channels of processing system 410. Bus 414 may couple the processor 418 with memory 412, random number generator circuits 430 and other peripherals and devices.

According to one aspect of the invention, applications 422 may include one or more instructions that cause processor 418 to directly access high-entropy random numbers stored in a buffer 406. The one or more instructions may belong to an instruction set defined for processing system 410 and/or processor 418. The instruction set may be used to program the processing system 410 and may be based on a machine language that comprises numerical codes that cause the processor to perform one of a defined set of actions. Actions may include data moves, register swaps, memory read/write, and so on.

In certain embodiments, random numbers in buffer 406 may be depleted independently of the occupancy of FIFO device 404, which may be automatically populated with pseudorandom numbers generated by RNG 402. FIFO device 406 may comprise one or more registers, FIFO devices, and other sequential or random access storage.

In some embodiments, conditioning module 416 may define one or more software functions executed by processor 418 in response to an interrupt received from random number generation circuits 430, or by a software exception. Software exceptions may be generated by a consumer of high-entropy numbers when, for example, FIFO device 406 is depleted by a series of reads of high-entropy numbers. Interrupt logic 408 monitors the state of one or more of FIFO devices 404 and 406. Random number generation circuits 430 may comprise interrupt logic 408 that is adapted or configured to assert an interrupt signal 428 coupled to processor 418 when FIFO device 406 is depleted below a threshold minimum level. An interrupt handler 410 may be invoked by the processor 418 in response to assertion of interrupt signal 428. Interrupt handler 410 may cause conditioning module 416 to be executed, whereby conditioning module 416 may perform a hash function, a block cipher, or another cryptographic function on low-entropy random numbers read from FIFO device 404 to produce a plurality of high-entropy random numbers. The high-entropy random numbers may then be transferred to buffer 406. The interrupt handler 410 may receive an interrupt 428 when buffer 406 is full, and/or when FIFO device 404 is empty or holds less than a minimum number of low-entropy random numbers, whereby interrupt handler may cause execution of conditioning module 416 to be suspended. In some embodiments, conditioning module 416 suspends itself if it determines that buffer 406 is full, and/or that FIFO device 404 is empty or holds less than a minimum number of low-entropy random numbers.

In one example, buffer 406 may comprise a FIFO device, a stack, a plurality of registers, and/or storage managed as a circular buffer. Buffer 406 typically comprises one or more interface devices 434 that that enable processor 418 to access high-entropy random numbers upon execution of one or more instructions provided in an instruction set. Interface devices 434 may be provided within the processor 418 or processing system 410. Interface devices 434 may be accessed through a port defined for processor 418, and/or at one or more addressable locations. In some embodiments, buffer 406 and/or bus interface 434 may be embodied in processor 418 or in another device of processing system 410.

Figure 5:
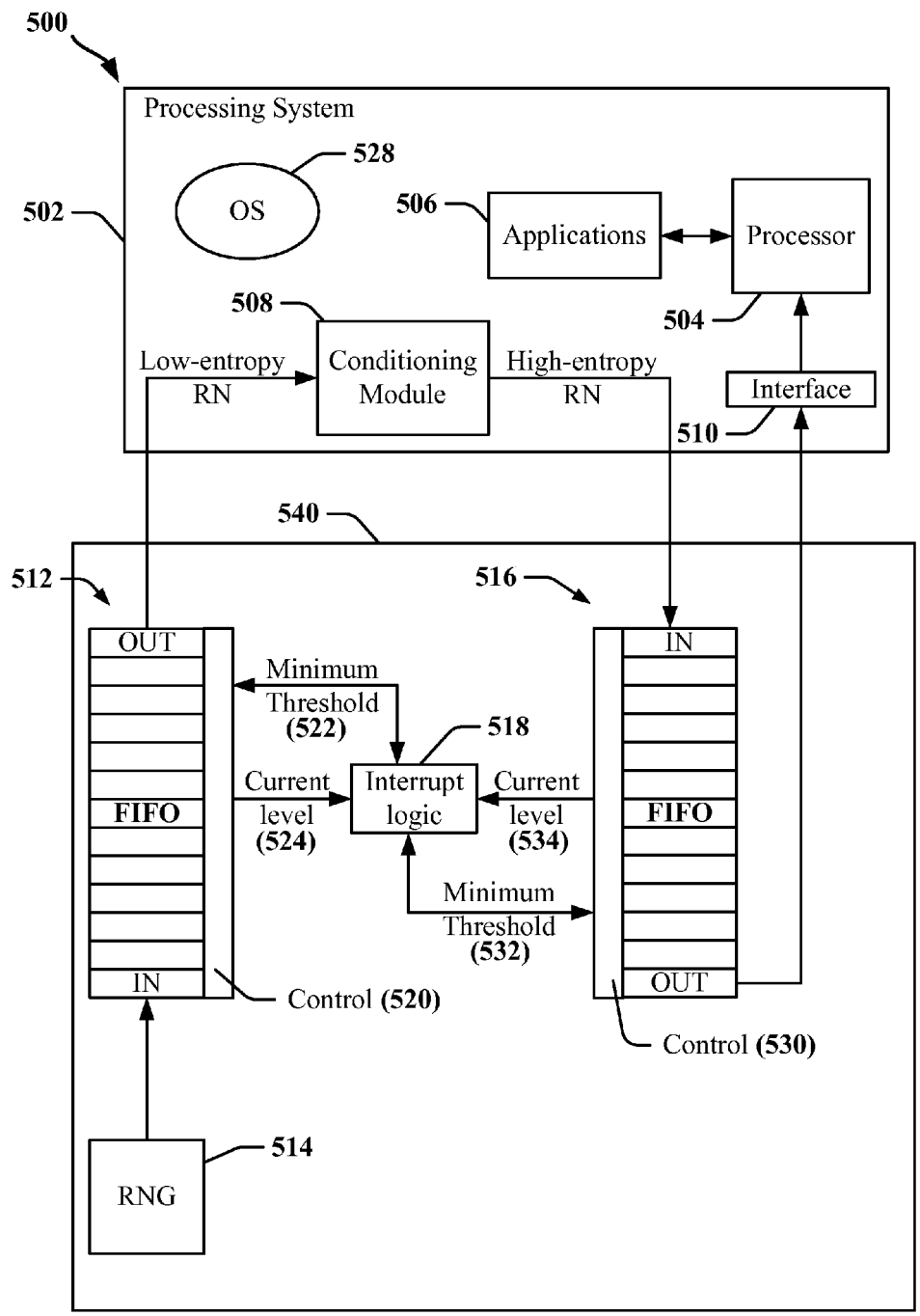
FIG. 5 is a block schematic illustrating buffer flow control in an interrupt-driven hardware random number generator.

FIG. 5 is a schematic diagram 500 illustrating flow control in an interrupt driven random-number processing system. In the example, a processing system 502 interacts with hardware random number generating and processing circuits 540. Processing system 502 comprises a processor 504 that executes one or more applications 506 and certain functions and algorithms of a conditioning module 508. Interrupt logic 518 may monitor current level 534 of FIFO device 516 to determine if the FIFO device 516 is full, empty, or partially filled. Interrupt logic 518 may be configured to interrupt processor 504 when FIFO device 516 is depleted such that it contains less than a threshold minimum number 532 of high-entropy random numbers. Interrupt logic 518 may monitor current level 524 of FIFO device 512 to determine if the FIFO device 512 is full, empty, or partially filled. In one example, interrupt logic 518 may be configured or adapted to generate an interrupt when the number of low-entropy random numbers in FIFO device 512 exceeds a threshold minimum value 522.

In one example, interrupt logic 518 is configured to interrupt processor 504 when FIFO device 512 can provide a sufficient number of low-entropy random numbers to produce at least one high-entropy random number. Accordingly, interrupt logic 518 may monitor current occupancy level 524 of FIFO device 512 to determine if the FIFO device 512 is full, empty, or partially filled. Interrupt logic 518 may be configured or adapted to generate an interrupt if the current number 524 of low-entropy random numbers in FIFO device 512 exceeds a threshold number 522, corresponding to the number of low-entropy random numbers required to generate at least one high-entropy random numbers. Interrupt logic 518 may be configured or adapted to prevent assertion of an interrupt until the current number 524 of low-entropy random numbers in FIFO device 512 exceeds a threshold number 522, corresponding to the number of low-entropy random numbers required to generate at least one high-entropy random numbers. Control logic 520 of FIFO device 512 may generate and monitor current level indicator 524 and/or minimum threshold level 522. FIFO device 512 typically receives a stream of low-entropy random numbers that have been at least partially conditioned by, for example, combining one or more pseudorandom numbers generated by RNG 514.

In some embodiments, thresholds 522, 532 used by interrupt logic 518 may be configured by an application 506 or by an operating system 528 that controls operation of processing system 502 and/or processor 504. Thresholds 522, 532 may be configured to modify behavior of one or more random number generation circuits 540 to support changing needs of one or more active applications 506. For example, average current level 534 of buffer 516 may be determined by some combination of control logic 530 and/or interrupt logic 518 through the configuration of the minimum threshold 532. Additional threshold levels may be monitored, including full, empty, severely depleted, etc. In some embodiments, interrupt generator logic 518 may be configured to assert interrupts with different priority levels, with highest priority level interrupts being asserted when a current level 534 of buffer 516 is at or below a minimum threshold level 532. A high priority level may ensure that buffer 516 is refilled before one or more applications 506 are blocked and/or the processor 504 stalls.

Access to buffer 516 may be controlled by one or more semaphores, mutual exclusion semaphores (mutexes), or other flags that may be implemented using control logic 530. In some embodiments, an attempted access of buffer 516 may return a null or other predefined value when buffer 516 is empty. In some embodiments an attempted access of buffer 516 may cause an interrupt to be asserted when the buffer 516 is empty. When an application 506 is waiting for high-entropy random numbers, conditioning module may cycle until sufficient low-entropy numbers are available in buffer 512.

In certain embodiments, applications 506 may include code that implements drivers and services of operating system 528, and operating system 528 may obtain random numbers from buffer 516 on behalf of one or more applications 506. The operating system 528 typically accesses the buffer 516 in the same manner that other applications 506 access the buffer 516. However, the priority of the interrupt used by interrupt logic 518 may be increased to avoid deadlock and/or priority inversion issues that may occur when a high priority task, or interrupt handler used by the operating system requires a random number, but the conditioning module 508 cannot be executed due to priority issues.

An instruction set for processing system 502 and/or processor 504 may include one or more machine language instructions that interact with the buffer 516 to obtain high entropy random numbers with minimized latency. Software modules 508 used to condition low-entropy random numbers can be expected to produce high-entropy random numbers at a significantly lower rate than equivalent hardware conditioning modules. However, interrupt-driven conditioning can ensure that enough high-entropy random numbers are available to match the latency obtained from systems that employ hardware conditioning. Typically, most applications require only occasional access to random numbers and the time between accesses can be measured in seconds, even for gaming and simulation applications.

Latency may be minimized through the use of direct access to buffer 516 by applications 506. Machine language instructions that interact with the buffer 506 may be employed in a driver and/or an application 506, which may be written in assembly language or in a higher level programming language. Latency of an efficiently compiled higher level language "get random" instruction may be limited to a number of clock cycles sufficient to execute a read from the buffer 516. Buffer 516 may comprise a FIFO device that is asynchronously filled with software-conditioned random numbers, and the "get random" instruction may read directly from the FIFO device of buffer 516 through a system data bus 414 (see FIG. 4) and/or through a port of processor 504.

As noted herein, the operation of buffer 516 may be modified to avoid stalling the processor 504 that can occur when buffer 512 is empty. The sizes of FIFO devices 512, 516 and threshold levels associated with FIFO devices 512, 516 may be selected to avoid delays in completing execution of a "get random" instruction. For high priority interrupts, a minimum current occupancy 534 of buffer 516 may be measured against a threshold level 532 set relatively high, which may result in more frequent interrupt activity with a relatively short amount of time spent in the interrupt handler and conditioning module 508. If buffer 516 is sufficiently large, a lower priority interrupt may be generated by interrupt logic 518 with a threshold level 532 set relatively low to obtain less frequent interrupts with a longer amount of time spent in the interrupt handler and conditioning module 508. Under high-stress usage, random number generation may devolve to the speed of a software conditioning solution, which may nevertheless be fast enough for most applications 506.

In some embodiments, one or more interrupt handlers may be employed to unload FIFO device 512 and load buffer/FIFO device 516, based on their respective fill levels. The conditioning functions may be executed as a task or thread of an operating system in order to free the system for high priority activities. For example, a real-time operating system or other system software requiring guaranteed low latency may require higher priority responses for voice and video communications tasks with high quality of service requirements, for example.

Figure 6:
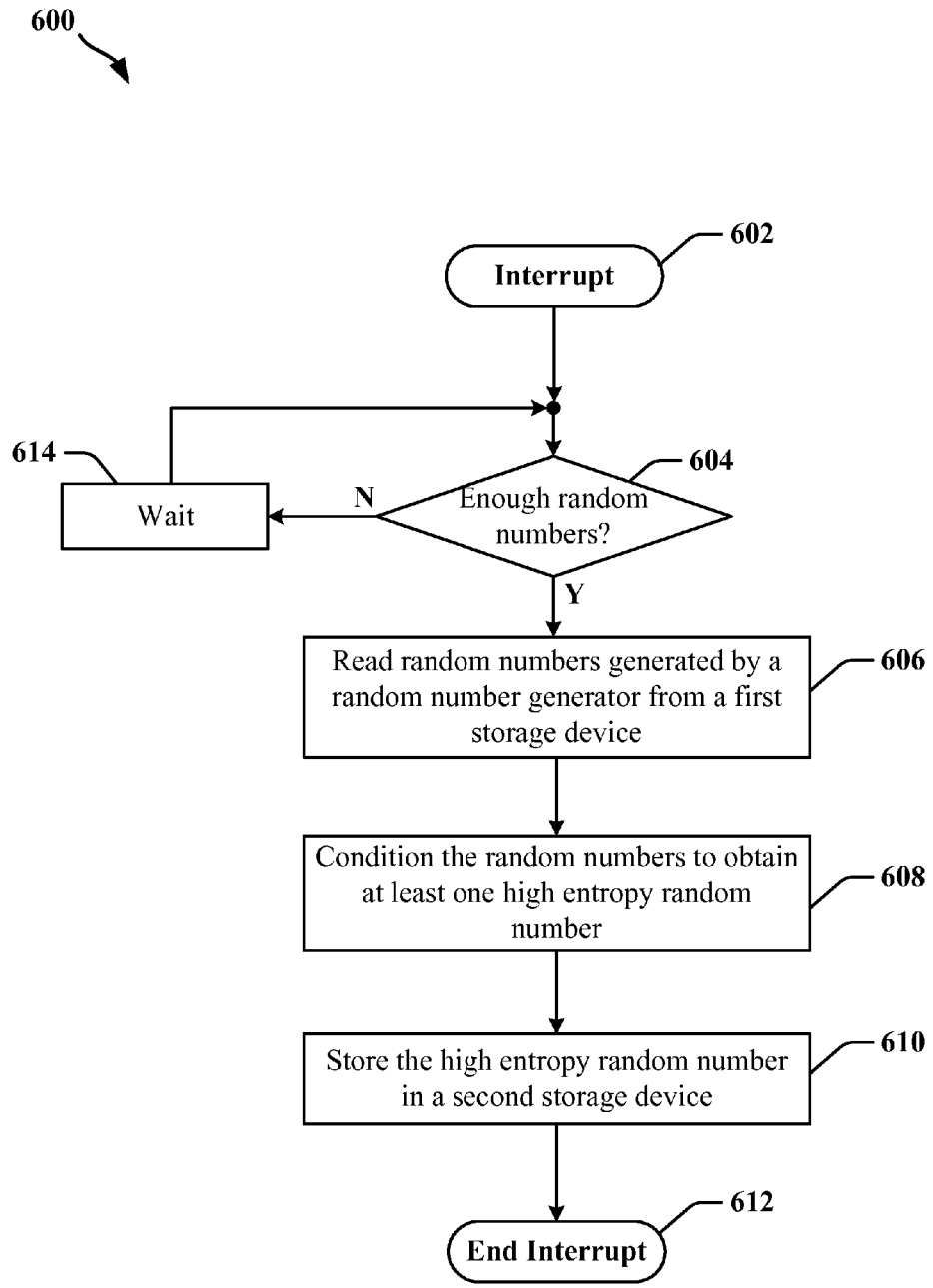
FIG. 6 is a flowchart illustrating a method according to certain aspects of the disclosure.

FIG. 6 is a flowchart illustrating a method for conditioning random numbers generated by a random number generator. The method may be performed by a processing circuit or device, such as processor 418 depicted in FIG. 4.

At step 602, the method may be triggered when the processor 418 is interrupted. The interrupt 428 may indicate the status of one or more storage devices. The one or more storage devices may comprise a first storage device 404 and a second storage device 406. One or more of the first and second storage devices 404, 406 may comprise a FIFO device. The second storage device 406 may be directly addressable by the processor 418. The interrupt 428 may comprise one or more signals generated and/or asserted by interrupt logic 408. Interrupt logic 408 may assert the interrupt 428 when the occupancy of the second storage device 406 falls below a first threshold minimum occupancy. The interrupt 428 may be asserted when the occupancy of the second storage device 406 falls below a first threshold minimum occupancy. The interrupt 428 may be asserted when the occupancy of the first storage device 404 exceeds a second threshold minimum occupancy. If no interrupt 428 is asserted, no further action is performed and the processor 418 continues to monitor interrupt 428 and/or one or more flags set by an interrupt handler 410 to indicate that an interrupt 428 has been processed. If an interrupt 428 has occurred, or has been processed, then the method proceeds to step 604.

In some embodiments, processor 418 may determine a cause for the interrupt. Processor 418 may initiate generation of the at least one conditioned random number when the interrupt is caused by depletion of the second storage device 406. Processor 418 may initiate generation of the at least one conditioned random number when the interrupt is caused by occupancy of the second storage device 406 falling below a threshold minimum occupancy. In some embodiments, processor 418 may wait until at least one conditioned random number is stored in the second storage device 406 when the interrupt is caused by the second storage device 406 is emptied. In some embodiments, processor 418 may wait until at least one conditioned random number is stored in the second storage device 406 when the interrupt is caused by an application accessing the second storage when the second storage device 406 is empty. In some embodiments, processor 418 may wait until the first storage device 404 contains sufficient random numbers to produce the at least one conditioned random number.

At step 604, the processor may determine whether sufficient random numbers are available in storage device 404 to obtain at least one conditioned, higher-entropy random number. In some embodiments, an interrupt may not be asserted unless occupancy of the first storage device 404 exceeds a second threshold minimum occupancy. The second threshold minimum occupancy may correspond to the number of random numbers required to produce the at least one conditioned random number. In some embodiments, the processor 418 may independently determine whether sufficient random numbers are contained in first storage device 404 and, if not, may wait until sufficient random numbers are deposited in the first storage device 404. Otherwise, the method proceeds to step 606.

At step 606, the processor 418 may read random numbers from the first storage device 404. The random numbers provided through the first storage device 404 generated by a random number generator 402. The random numbers generated by the random number generator 402 may comprise low-entropy data such as pseudorandom numbers. In one example, the contents of first storage device 404 may be read by processor 418 through a bus interface 432 that may comprise one or more of a line driver, a register and logic for monitoring and responding to signals controlling operations of the bus 414. In another example, at least a portion of the first storage device 404 comprises a register embodied in processor 418 through which the processor 418 may read the contents of first storage device 404

At step 608, the processor 418 may condition the random numbers generated by the random number generator 402 to obtain at least one high-entropy random number. The random numbers generated by the random number generator 402 may be conditioned using a cryptographic function. The random numbers generated by the random number generator 402 may be conditioned using an algorithm configured to increase entropy of the at least one conditioned random number with respect to entropies of random numbers in the sequence of random numbers. The random numbers generated by the random number generator 402 may be conditioned by hashing a plurality of the random numbers generated by the random number generator 402. The random numbers generated by the random number generator 402 may be conditioned using a block cipher function. The random numbers generated by the random number generator 402 may be conditioned using a function selected to reduce a correlation between a plurality of high entropy random numbers stored in the second storage device 406.

At step 610, the processor 418 may store the at least one high entropy random number in the second storage device 406. The method may then terminate at step 612.

The second storage device 406 may be configured to output the at least one high entropy random number in response to a machine language instruction 408 executed by the processor 418. In one example, the contents of second storage device 406 may be read by processor 418 through a bus interface 434 that may comprise some combination of line drivers, registers and logic for monitoring and responding to signals controlling operations of the bus 414. In another example, at least a portion of the second storage device 406 comprises a register embodied in processor 418 through which the processor 418 may read the contents of second storage device 406.

In some embodiments, the second storage device 406 may be accessed directly, typically in response to an instruction executed by the processor 418 invoked by an application 422. The instruction may comprise a machine language instruction.

Figure 7:
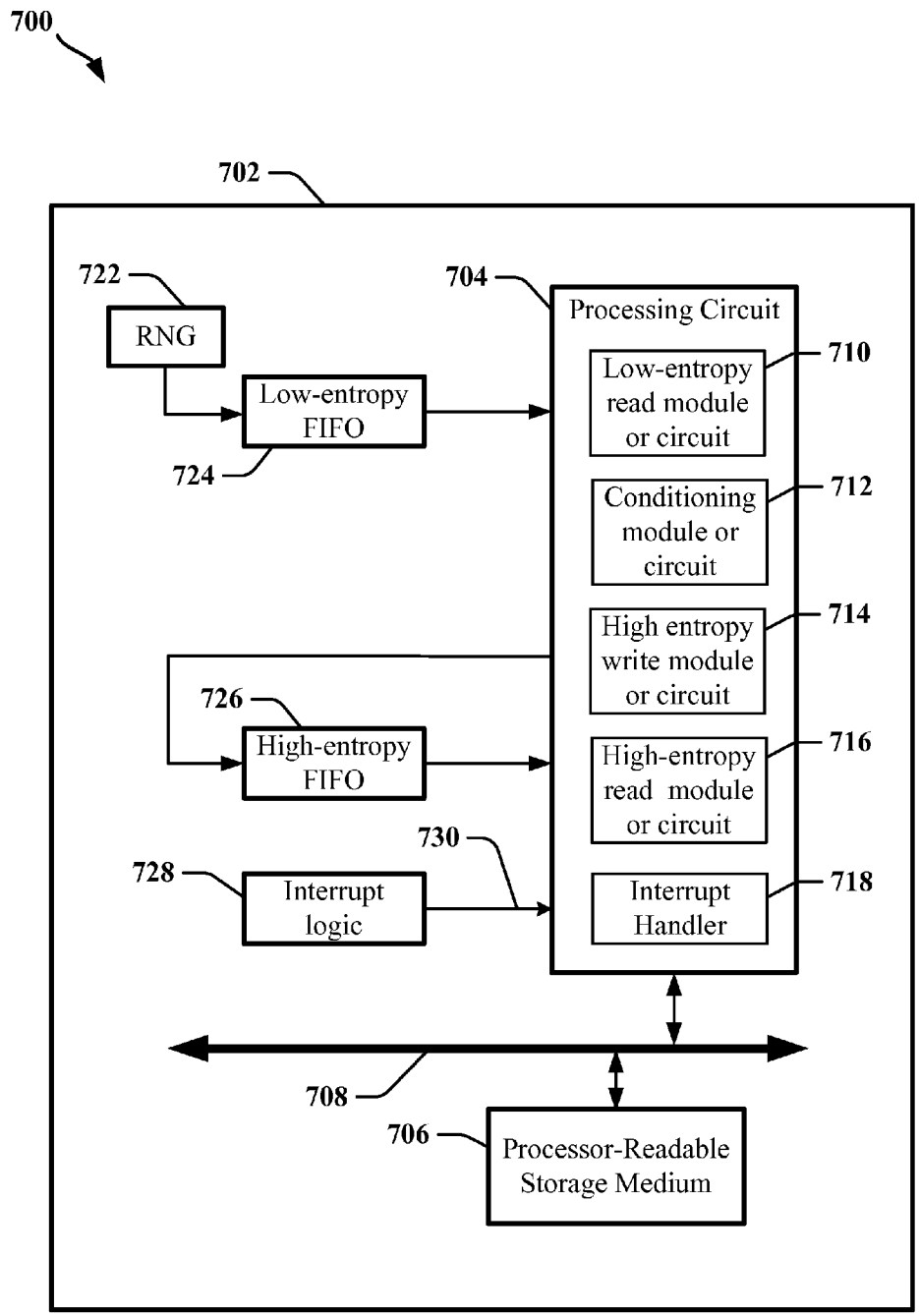
FIG. 7 is a block schematic of an apparatus that comprises an interrupt-driven hardware random number generator.

FIG. 7 is a diagram 700 illustrating an example of a hardware implementation for an apparatus employing a processing system 702. The processing system 702 may be implemented using a bus architecture, represented generally by bus 708, which may comprise a plurality of interconnecting buses and bridges depending on the specific application of processing system 702 and system requirements and specifications. Bus 708 may communicatively couple circuits including one or more processors, including software and/or hardware modules, represented as processing circuit 704, modules 710, 712, 714, 716, 718, and a storage medium 706 which is readable by a computer, a processing system 702, and/or one or more processors or processing circuits 704. Bus 708 may also connect other circuits such as clock and timing sources, peripherals, voltage regulators, and power management circuits.

Processing system 702 may comprise various circuits used for random number generation, including RNG 722, and one or more storage devices such as FIFO devices 724 and 726. Processing system 702 may comprise interrupt management modules and/or circuits including interrupt handler 718 and interrupt generating logic 728. The processing system may include a processing circuit 704 coupled to a processor-readable storage medium 706. Processing circuit 704 may comprise one or more of a microprocessor, a digital signal processor and sequencing logic that may be controlled using instructions stored in processor-readable storage media 706. Processing circuit 704 may be responsible for general processing, including the execution of software stored on the processor-readable medium 706. The software, when executed by the processing circuit 704, causes the processing system 702 to perform the various functions described supra. The processor-readable storage medium 706 may also be used for storing data that is manipulated by the processing circuit 704 when executing software. The processing circuit further includes at least one of the modules or circuits 710, 712, 714, 716 and 718. The modules may include software modules executed by the processing circuit 704, where the software modules may be resident and/or stored in the processor-readable readable medium 706, one or more hardware modules embodied in and/or coupled to the processing circuit 704, or some combination thereof.

In one configuration, the apparatus includes means 710 for reading random numbers generated by a random number generator 722 from a storage device 724 in response to an interrupt 730, means 712 for conditioning the random numbers to obtain at least one high-entropy random number, means 714 for storing the at least one high-entropy random number in a second storage device 726, and means 716 for reading high-entropy random numbers from second storage device 726 in response to an instruction executed by processing system 704.

The aforementioned means may be one or more of the aforementioned modules of the processing system 702 of the apparatus, configured to perform the functions recited by the aforementioned means.

Any implementation or aspect described herein is not necessarily to be construed as preferred or advantageous over other aspects of the disclosure. The term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another— even if they do not directly physically touch each other. For instance, a first die may be coupled to a second die in a package even though the first die is not directly physically in contact with the second die.

The term "die" may be used herein to include an IC. A die may include one or more circuits. The term "unit" may refer to a component that is part of a die and/or circuit of a die. A unit may be located in one die or a unit may be part of a semiconductor device, system and/or package that is distributed over several dice and/or circuits. Thus, a unit may refer to a component that is physically and/or logically located in several locations.

One or more of the components, steps, features and/or functions illustrated in FIGS. 1-7 may be rearranged and/or combined into a single component, step, feature or function or embodied in several components, steps, or functions. Additional elements, components, steps, and/or functions may also be added without departing from novel aspects and/or features disclosed herein. The apparatus, devices, and/or components illustrated in FIGS. 1-5 and 7 may be configured to perform one or more of the methods, features, or steps described herein. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The terms "machine readable medium" or "machine readable storage medium" include, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s) such as storage device 412 (FIG. 4). A processor 418 may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits (e.g., processing circuit), elements, and/or components described in connection with the examples disclosed herein may be implemented or performed with a general purpose processor, a digital signal processor (DSP), an ASIC, an FPGA or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. An apparatus, comprising:
 a random number generator circuit;
 a first storage device that receives random numbers generated by the random number generator circuit;
 a processing circuit configured to:
  read a sequence of random numbers from the first storage device in response to an interrupt;
  generate at least one conditioned random number by conditioning the sequence of random numbers; and store the at least one conditioned random number in a second storage device,
wherein the second storage device is configured to maintain a plurality of conditioned random numbers and to output one of the plurality of conditioned random numbers in response to an instruction executed by the processing circuit.

2. The apparatus of claim 1, further comprising interrupt logic circuit that asserts the interrupt when an occupancy of the second storage device falls below a first threshold minimum occupancy.

3. The apparatus of claim 2, wherein the interrupt logic circuit asserts the interrupt when an occupancy of the first storage device exceeds a second threshold minimum occupancy.

4. The apparatus of claim 3, wherein the second threshold minimum occupancy corresponds to a number of random numbers required to produce the at least one conditioned random number.

5. The apparatus of claim 1, wherein the processing circuit comprises a processor that receives the interrupt, the processor being configured to:
determine a cause for the interrupt; and
initiate generation of the at least one conditioned random number when the interrupt is caused by depletion of the second storage device, or by an occupancy of the second storage device falling below a threshold minimum occupancy.

6. The apparatus of claim 5, wherein the processor is configured to:
cause the processing circuit to wait until the at least one conditioned random number is stored in the second storage device when the interrupt is caused by emptying of the second storage device.

7. The apparatus of claim 5, wherein the processor is configured to:
cause the processing circuit to wait until the at least one conditioned random number is stored in the second storage device when the interrupt is caused by an application accessing the second storage device when the second storage device is empty.

8. The apparatus of claim 5, wherein the processor is configured to:
cause the processing circuit to wait until the first storage device contains sufficient random numbers to produce the at least one conditioned random number.

9. The apparatus of claim 1, wherein the sequence of random numbers is conditioned using a cryptographic function.

10. The apparatus of claim 1, wherein the sequence of random numbers is conditioned using a hash function.

11. The apparatus of claim 1, wherein the sequence of random numbers is conditioned using a block cipher function.

12. The apparatus of claim 1, wherein the sequence of random numbers is conditioned using an algorithm configured to increase entropy of the at least one conditioned random number with respect to entropies of random numbers in the sequence of random numbers.

13. The apparatus of claim 1, wherein the instruction executed by the processing circuit is invoked by an application and causes the processing circuit to directly access the second storage device.

14. The apparatus of claim 13, wherein the instruction executed by the processing circuit comprises a machine language instruction.

15. The apparatus of claim 1, wherein each of the first storage device and the second storage device comprises a first-in-first-out device.

16. A method for generating random numbers, comprising:
reading by a processing circuit, random numbers generated by a random number generator circuit from a first storage device in response to an interrupt;
conditioning by the processing circuit, the random numbers generated by the random number generator circuit to obtain at least one high-entropy random number; and
storing by the processing circuit, the at least one high-entropy random number in a second storage device,
wherein the second storage device outputs the at least one high-entropy random number in response to an instruction executed by the processing circuit.

17. The method of claim 16, wherein the interrupt is asserted when the occupancy of the second storage device falls below a first threshold minimum occupancy.

18. The method of claim 17, wherein the interrupt is asserted when the occupancy of the first storage device exceeds a second threshold minimum occupancy.

19. The method of claim 18 wherein the second threshold minimum occupancy corresponds to a number of random numbers required to produce the at least one conditioned random number.

20. The method of claim 16, wherein conditioning the random numbers generated by the random number generator circuit includes hashing a plurality of the random numbers generated by the random number generator circuit.

21. The method of claim 16, wherein conditioning the random numbers generated by the random number generator circuit includes using a block cipher function.

22. The method of claim 16, wherein conditioning the random numbers generated by the random number generator circuit includes using a cryptographic function selected to reduce correlation between a plurality of high-entropy random numbers stored in the second storage device.

23. The method of claim 16, wherein conditioning the random numbers generated by the random number generator circuit comprises:
waiting until the first storage device contains sufficient random numbers to produce the at least one conditioned random number.

24. An apparatus for generating random numbers, comprising:
means for reading random numbers generated by a random number generator circuit from a storage device in response to an interrupt;
means for conditioning the random numbers generated by the random number generator circuit to obtain at least one high-entropy random number; and
means for storing the at least one high-entropy random number,
wherein the means for storing is configured to output the at least one high-entropy random number in response to a machine language instruction executed by a processing circuit.

25. The apparatus of claim 24, wherein the means for storing the at least one high-entropy random number comprises a first-in-first-out (FIFO) device.

26. The apparatus of claim 25, further comprising means for asserting the interrupt, wherein the interrupt is asserted when the occupancy of the FIFO device falls below a first threshold minimum occupancy.

27. The apparatus of claim 26, wherein the interrupt is asserted when the occupancy of a FIFO in the storage device exceeds a second threshold minimum occupancy.

28. The apparatus of claim 24, wherein the means for conditioning the random numbers is configured to hash a plurality of the random numbers generated by the random number generator circuit.

29. The apparatus of claim 24, wherein the means for conditioning the random numbers generated by the random number generator circuit uses a block cipher function.

30. The apparatus of claim 24, wherein the means for conditioning the random numbers generated by the random number generator circuit uses a cryptographic function selected to reduce a correlation between a plurality of high-entropy random numbers read from the storage device.

31. A non-transitory computer-readable medium having one or more instructions which, when executed by at least one processing circuit, cause the at least one processing circuit to:
   read random numbers generated by a random number generator circuit from a first buffer circuit in response to an interrupt;
   condition the random numbers generated by the random number generator circuit to obtain at least one high-entropy random number; and
   store the at least one high-entropy random number in a second buffer circuit,
   wherein the second buffer circuit is outputs the at least one high-entropy random number in response to a machine language instruction executed by a processing circuit.

32. The non-transitory computer-readable medium of claim 31, wherein the interrupt is asserted when the occupancy of the second buffer circuit falls below a first threshold minimum occupancy.

33. The non-transitory computer-readable medium of claim 32, wherein the interrupt is asserted when the occupancy of the first buffer circuit exceeds a second threshold minimum occupancy.

34. The non-transitory computer-readable medium of claim 33 wherein the second threshold minimum occupancy corresponds to a number of random numbers required to produce the at least one conditioned random number.

35. The non-transitory computer-readable medium of claim 31, wherein the random numbers generated by the random number generator circuit are conditioned by hashing a plurality of the random numbers generated by the random number generator circuit.

36. The non-transitory computer-readable medium of claim 31, wherein the random numbers generated by the random number generator circuit are conditioned using a block cipher function.

37. The non-transitory computer-readable medium of claim 31, wherein the random numbers generated by the random number generator circuit are conditioned using a cryptographic function selected to reduce a correlation between a plurality of high-entropy random numbers stored in the second buffer circuit.

38. The non-transitory computer-readable medium of claim 31, wherein the one or more instructions cause the at least one processing circuit to:
   wait until the first buffer circuit contains sufficient random numbers to produce the at least one conditioned random number before conditioning the random numbers generated by the random number generator circuit.

* * * * *